United States Patent
Culman

(10) Patent No.: US 12,177,411 B2
(45) Date of Patent: Dec. 24, 2024

(54) SYSTEMS AND METHODS IMPLEMENTING DISTANCE-BASED IMAGE SENSOR WINDOWING

(71) Applicant: Intuitive Surgical Operations, Inc., Sunnyvale, CA (US)

(72) Inventor: William Jason Culman, Scotts Valley, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 281 days.

(21) Appl. No.: 17/682,215

(22) Filed: Feb. 28, 2022

(65) Prior Publication Data

US 2022/0286661 A1    Sep. 8, 2022

Related U.S. Application Data

(60) Provisional application No. 63/155,853, filed on Mar. 3, 2021.

(51) Int. Cl.
| | |
|---|---|
| *H04N 13/239* | (2018.01) |
| *G06T 7/70* | (2017.01) |
| *H04N 23/50* | (2023.01) |
| *H04N 23/62* | (2023.01) |

(52) U.S. Cl.
CPC ............ *H04N 13/239* (2018.05); *G06T 7/70* (2017.01); *H04N 23/62* (2023.01); *G06T 2207/20092* (2013.01); *H04N 23/555* (2023.01)

(58) Field of Classification Search
CPC .... H04N 13/239; H04N 23/62; H04N 23/555; G06T 7/70; G06T 2207/20092
See application file for complete search history.

(56) References Cited

U.S. PATENT DOCUMENTS

2017/0188013 A1* 6/2017 Presler .................. H04N 5/772
2021/0145523 A1* 5/2021 Xing ...................... G16H 30/40

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

*Primary Examiner* — On S Mung

(57) ABSTRACT

An illustrative system may include a stereoscopic imaging device comprising: a first image sensor having a first pixel array and configured to provide a first windowed output comprising first image information associated with pixels included within a first window of the first pixel array, the first window having a first position; and a second image sensor having a second pixel array and configured to provide a second windowed output comprising second image information associated with pixels included within a second window of the second pixel array, the second window having a second position; and an imaging control system that may be configured to: determine a working distance between a target surface within a scene and the stereoscopic imaging device; and adjust one or more of the first position of the first window within the first pixel array or the second position of the second window within the second pixel array.

20 Claims, 10 Drawing Sheets

SYSTEMS AND METHODS IMPLEMENTING DISTANCE-BASED IMAGE SENSOR WINDOWING

RELATED APPLICATIONS

The present application claims priority under 35 U.S.C. § 119(e) to U.S. Provisional Patent Application No. 63/155,853, filed on Mar. 3, 2021, which is incorporated herein by reference in its entirety.

BACKGROUND INFORMATION

A stereoscopic imaging device (e.g., an endoscope) may include left and right image sensors configured to capture overlapping views of a scene (e.g., a surgical scene). The portions of the views that overlap may be used to generate a three-dimensional ("3D") image of the scene that may be provided for display to a user (e.g., a surgeon performing a surgical procedure).

A stereoscopic imaging device may be calibrated for stereo convergence at a predefined distance from the stereoscopic imaging device. As such, when a distance between the stereoscopic imaging device and a target surface in the scene changes (e.g., decreases), the amount of overlap between the views captured by the left image sensor and the right image sensor may change, which may undesirably affect image quality (e.g., by reducing resolution) of the resulting 3D image.

SUMMARY

An illustrative system comprises a stereoscopic imaging device comprising: a first image sensor having a first pixel array and configured to provide a first windowed output, the first windowed output comprising first image information associated with pixels included within a first window of the first pixel array, the first window having a first position that is adjustable within the first pixel array and a smaller pixel resolution than the first pixel array; and a second image sensor having a second pixel array and configured to provide a second windowed output, the second windowed output comprising second image information associated with pixels included within a second window of the second pixel array, the second window having a second position that is adjustable within the second pixel array and a smaller pixel resolution than the second pixel array; and an imaging control system configured to: determine a working distance between a target surface within a scene and the stereoscopic imaging device; and adjust, based on the working distance between the target surface and the stereoscopic imaging device, one or more of the first position of the first window within the first pixel array or the second position of the second window within the second pixel array.

An illustrative apparatus comprises one or more processors; and memory storing executable instructions that, when executed by the one or more processors, cause the apparatus to: determine a working distance between a target surface within a scene and a stereoscopic imaging device that comprises: a first image sensor having a first pixel array and configured to provide a first windowed output, the first windowed output comprising first image information associated with pixels included within a first window of the first pixel array, the first window having a first position that is adjustable within the first pixel array and a smaller pixel resolution than the first pixel array; and a second image sensor having a second pixel array and configured to provide a second windowed output, the second windowed output comprising second image information associated with pixels included within a second window of the second pixel array, the second window having a second position that is adjustable within the second pixel array and a smaller pixel resolution than the second pixel array; and adjust, based on the working distance between the target surface and the stereoscopic imaging device, one or more of the first position of the first window within the first pixel array or the second position of the second window within the second pixel array.

An illustrative method comprises determining, by an imaging control system, that a working distance changes between a target surface within a scene and a stereoscopic imaging device that comprises: a first image sensor having a first pixel array and configured to provide a first windowed output, the first windowed output comprising first image information associated with pixels included within a first window of the first pixel array, the first window having a first position that is adjustable within the first pixel array and a smaller pixel resolution than the first pixel array; and a second image sensor having a second pixel array and configured to provide a second windowed output, the second windowed output comprising second image information associated with pixels included within a second window of the second pixel array, the second window having a second position that is adjustable within the second pixel array and a smaller pixel resolution than the second pixel array; and recalibrating, by the imaging control system and based on the change in the working distance, the stereoscopic imaging device for stereo convergence at the working distance by adjusting one or more of the first position of the first window within the first pixel array or the second position of the second window within the second pixel array.

An illustrative non-transitory tangible computer program product comprises a tangible computer readable medium configured to store computer readable instructions that, when executed, cause a processor of a computing device to determine a working distance between a target surface within a scene and a stereoscopic imaging device that comprises: a first image sensor having a first pixel array and configured to provide a first windowed output, the first windowed output comprising first image information associated with pixels included within a first window of the first pixel array, the first window having a first position that is adjustable within the first pixel array and a smaller pixel resolution than the first pixel array; and a second image sensor having a second pixel array and configured to provide a second windowed output, the second windowed output comprising second image information associated with pixels included within a second window of the second pixel array, the second window having a second position that is adjustable within the second pixel array and a smaller pixel resolution than the second pixel array; and adjust, based on the working distance between the target surface and the stereoscopic imaging device, one or more of the first position of the first window within the first pixel array or the second position of the second window within the second pixel array.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Systems and methods implementing distance-based image sensor windowing are described herein. As will be described in more detail below, an illustrative system may comprise a stereoscopic imaging device and an imaging control system. The stereoscopic imaging device may include a first image sensor having a first pixel array that may be configured to provide a first windowed output. The first windowed output may comprise first image information associated with pixels included within a first window of the first pixel array. The first window may have a first position that is adjustable within the first pixel array and a smaller pixel resolution than the first pixel array. The stereoscopic imaging device may further include a second image sensor having a second pixel array that may be configured to provide a second windowed output. The second windowed output may comprise second image information associated with pixels included within a second window of the second pixel array. The second window may have a second position that is adjustable within the second pixel array and a smaller pixel resolution than the second pixel array. The imaging control system may be configured to determine a working distance between a target surface within a scene and the stereoscopic imaging device. The imaging control system may adjust, based on the working distance between the target surface and the stereoscopic imaging device, one or more of the first position of the first window within the first pixel array or the second position of the second window within the second pixel array.

Various advantages and benefits are associated with systems and methods described herein. For example, systems and methods described herein may optimize a common field of view for both eyes of a user (e.g., a surgeon and/or another user associated with a computer-assisted surgical system) at different working distances from an object (e.g., a target surface) in a scene. This may reduce eye strain for the user, ensure optimal pixel resolution in a 3D image of the scene, and/or provide other advantages and benefits over conventional configurations. These and other benefits that may be realized by the systems and methods described herein will be evident from the disclosure that follows.

Figure 1:
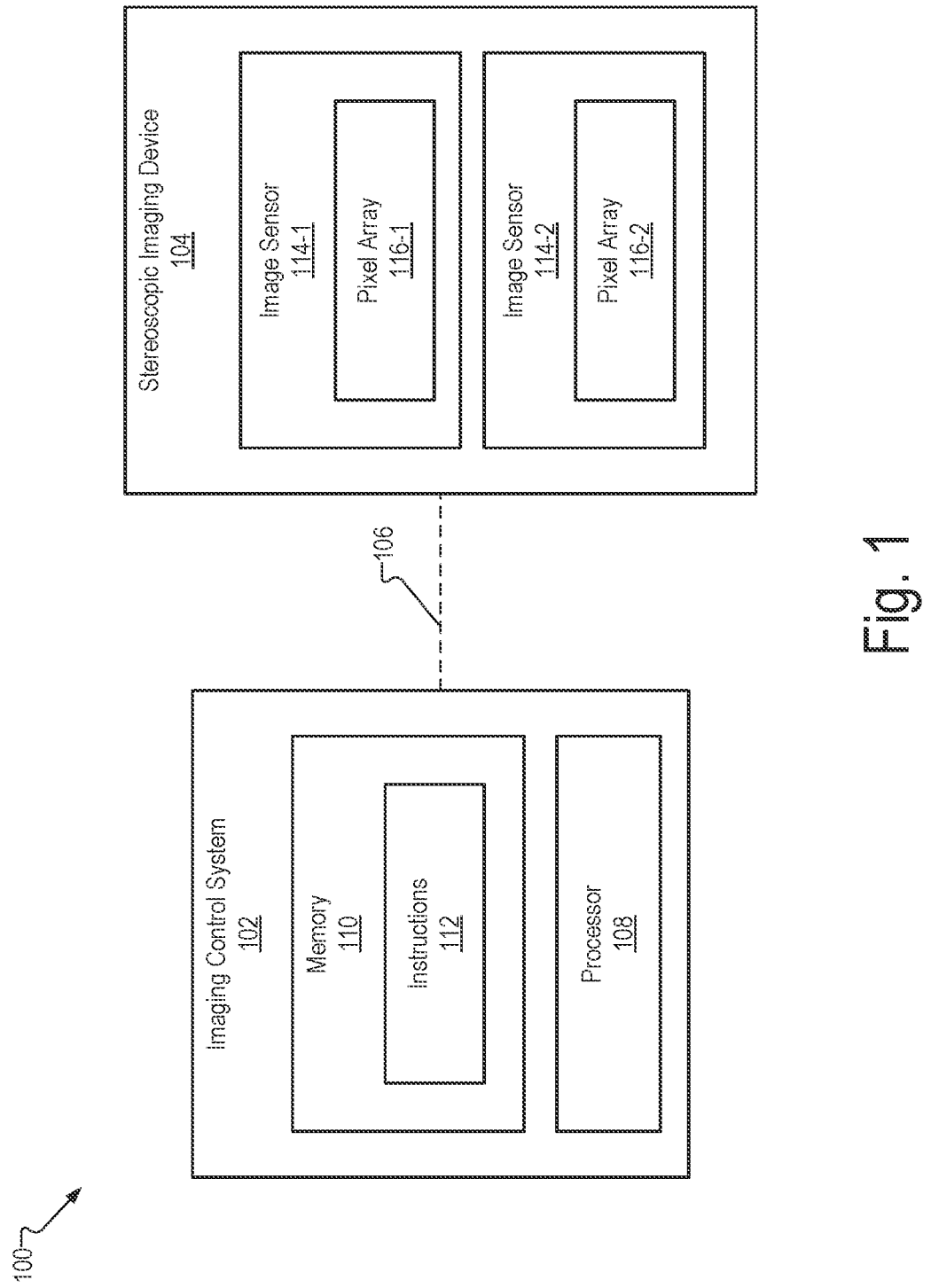
FIG. 1 shows an illustrative system according to principles described herein.

FIG. 1 shows an illustrative system 100 that may be provided according to principles described herein to implement distance-based image sensor windowing. As shown, system 100 may include, without limitation, an imaging control system 102 and a stereoscopic imaging device 104 that are communicatively coupled to each other by way of one or more communication links 106. Communication link(s) 106 may be implemented by any suitable wired and/or wireless communication link(s) as may serve a particular implementation. To this end, imaging control system 102 and stereoscopic imaging device 104 may each include one or more wired or wireless communication interfaces, such as one or more local area network interfaces, Wi-Fi network interfaces, cellular interfaces, etc. In some examples, imaging control system 102 and stereoscopic imaging device 104 may be implemented by a single device (e.g., a single computing device). In certain alternate examples, imaging control system 102 and stereoscopic imaging device 104 may be distributed between multiple devices and/or multiple locations as may serve a particular implementation.

As shown in FIG. 1, imaging control system 102 includes a processor 108 and memory 110 selectively and communicatively coupled to one another. Processor 108 and memory 110 may each include or be implemented by hardware and/or software components (e.g., processors, memories, communication interfaces, instructions stored in memory for execution by the processors, etc.).

Memory 110 may maintain (e.g., store) executable data used by processor 108 to perform any of the operations described herein. For example, memory 110 may store instructions 112 that may be executed by processor 108 to perform any of the operations described herein. Instructions 112 may be implemented by any suitable application, software, code, and/or other executable data instance.

Memory 110 may also maintain any data received, generated, managed, used, and/or transmitted by processor 108. For example, memory 110 may maintain any suitable data associated with implementing distance-based image sensor windowing. Such data may include, but is not limited to, imaging data representative of images of a scene as captured by stereoscopic imaging device 104, window position data representative of which pixels of a pixel array are included in a window, data associated with one or more objects in a scene, depth map information associated with a scene, user interface content (e.g., graphical objects, notifications, etc.), image sensor configuration data, user input data, and/or any other suitable data.

Processor 108 may be configured to perform (e.g., execute instructions 112 stored in memory 110) various processing operations associated with implementing distance-based image sensor windowing. Examples of such operations are described herein as being performed by processor 108 and/or imaging control system 102.

Stereoscopic imaging device 104 may be implemented by an endoscope or other suitable device configured to capture stereoscopic images of a scene. To this end, stereoscopic imaging device 104 may include image sensors 114 (e.g., image sensor 114-1 and image sensor 114-2) that each include a pixel array 116 (e.g., image sensor 114-1 includes pixel array 116-1 and image sensor 114-2 includes pixel array 116-2). Stereoscopic imaging device 104 may comprise any suitable imaging device and/or components (e.g., lenses) configured to facilitate capturing imagery of a scene. In certain examples, the scene may include a surgical scene in which imagery may be captured by image sensors 114 during a surgical procedure.

Image sensors 114 may each be associated with a respective eye of a user. For example, image sensor 114-1 may capture imagery of the scene to be viewed by a left eye of a user (e.g., using a stereoscopic image viewer) and image sensor 114-2 may capture imagery of the scene to be viewed by a right eye of the user (e.g., using the stereoscopic image viewer).

Image sensors 114 may be arranged in any suitable manner as may serve a particular implementation. For example, image sensors 114 may be arranged in a parallel front-facing configuration in certain implementations with image sensor 114-1 being provided adjacent to image sensor 114-2 and facing a same direction as image sensor 114-2. Alternatively, image sensors 114 may have a back-to-back configuration with image sensor 114-1 facing an opposite direction than image sensor 114-2. For example, image sensor 114-1 may face a first direction that is perpendicular to a longitudinal axis of an imaging device (e.g., an endoscopic imaging device) whereas image sensor 114-2 may face a second direction that is opposite to the first direction. In certain examples, one or more optical elements (e.g., one or more prisms) may be provided to guide light towards each of image sensors 114-1 and 114-2 when image sensors 114-1 and 114-2 have a back-to-back configuration. Specific examples of configurations of image sensors 114 are described further herein.

Image sensors 114 may be configured to capture one or more images (e.g., one or more visible light images and/or one or more other images in different wavelength bands) of a scene and output image information representative of the one or more images. In some examples, image sensors 114 may be further configured to generate depth data associated with the scene and/or information that may be used to derive depth data associated with the scene.

Pixel arrays 116 may have any suitable resolution and/or aspect ratio and may include any suitable number of pixels as may serve a particular implementation. In certain examples, pixel array 116-1 may have the same resolution, aspect ratio, and/or number of pixels as pixel array 116-2.

In certain examples, pixel arrays 116 may have a relatively high pixel resolution (e.g., a relatively high number of megapixels). Imaging control system 102 might not have sufficient computing power to process all of the image information that may be captured by image sensors 114 at a suitable framerate (e.g., 60 frames per second). As such, image sensors 114 may be configured to provide a windowed output from pixel arrays 116 (also may be referred to herein as windowing). For example, image sensor 114-1 may be configured to provide a first windowed output that comprises first image information associated with pixels included within a first window of pixel array 116-1. Image sensor 114-2 may be configured to provide a second windowed output that comprises second image information associated with pixels included within a second window of pixel array 116-2.

The first window may have a smaller resolution than pixel array 116-1, and the second window may have a smaller resolution than pixel array 116-2. The first window and the second window may include any suitable subset of the total number of pixels included respectively in pixel array 116-1 and 116-2 as may serve a particular implementation. In certain examples, the first window and the second window may correspond to regions within the scene where a field of view associated with image sensor 114-1 overlaps a field of view associated with image sensor 114-2.

In certain examples, image sensor 114-1 may abstain from outputting image information associated with pixels not included in the first window. Similarly, image sensor 114-2 may abstain from outputting image information associated with pixels not included in the second window. In so doing, it may be possible to use pixel arrays having a large number of pixels and still process image information at a suitable framerate.

As will be described further herein, the first window may have a first position that is adjustable within pixel array 116-1 and that has a smaller pixel resolution than pixel array 116-1. Similarly, the second window may have a second position that is adjustable within pixel array 116-2 and that has a smaller pixel resolution than pixel array 116-2. Pixel array 116-1 and 116-2 may have any suitable pixel resolution depending on the computing power of imaging control system 102.

Prior to adjusting a position of one or more of the first or second windows, stereoscopic imaging device 104 may be calibrated (e.g., by imaging control system 102 or in any other suitable manner) for stereo convergence at a convergence point that is a working distance from stereoscopic imaging device 104. The working distance may correspond to any suitable distance from stereoscopic imaging device 104 to the convergence point.

In certain examples, stereoscopic imaging device 104 may include one or more optical elements that have angular fields of view of a scene. For example, stereoscopic imaging device 104 may have one or more lenses that are associated with image sensor 114-1 and that have a first angular field of view. Stereoscopic imaging device 104 may have one or more lenses that are associated with image sensor 114-2 and that have a second angular field of view. While stereoscopic imaging device 104 is at the working distance, image sensor 114-1 may be configured to capture light from a third angular field of view that is less than the first angular field of view and image sensor 114-2 may be configured to capture light from a fourth angular field of view that is less than the second angular field of view. Illustrative angular fields of view associated with such optical elements are described further herein.

During capture of imagery of a scene, the working distance between stereoscopic imaging device 104 and a target surface may be greater than or less than a distance between a convergence point and stereoscopic imaging device 104. As a result, an amount of overlap between the field of views captured by image sensor 114-1 and image sensor 114-2 may change, which may result in a loss of field of view of the scene. To prevent or mitigate this, imaging control system 102 may be configured to dynamically adjust a position of a window within one or more of pixel arrays 116 based on a working distance between stereoscopic imaging device and a target surface within a scene. To that end, imaging control system 102 may determine a working distance between a target surface within a scene and stereoscopic imaging device 104. As used herein, a target surface may correspond to any suitable surface that may be provided within a scene. For example, a target surface may correspond to a surface of any object that may be located within the scene, such as tissue within a surgical scene.

In certain examples there may be multiple potential target surfaces within a scene. For example, a scene may include a first potential target surface, a second potential target surface, and a third potential target surface. The first potential target surface, the second potential target surface, and the third potential target surface may be located at different distances from stereoscopic imaging device 104 within the scene. Imaging control system 102 may choose which potential target surface to use as the target surface in any suitable manner. In certain examples, imaging control system 102 may choose a potential target surface that is closest to stereoscopic imaging device 104 as the target surface. For example, if the third potential target surface is closer to stereoscopic imaging device 104 than the first and second potential target surfaces, system may select the third potential target surface as the target surface. In certain alternative examples, imaging control system 102 may choose a background surface within the scene as a target surface. In such examples, imaging control system 102 may ignore other potential surfaces that may be provided between the background surface and stereoscopic imaging device 104. To illustrate an example, in implementations in which a scene corresponds to a surgical scene, tissue of a patient may correspond to a background surface and one or more instruments provided between the tissue and stereoscopic imaging device 104 may correspond to other potential target surfaces. In such an example, imaging control system 102 may designate the tissue as the target surface and may ignore the one or more instruments when adjusting a position of a window within a pixel array.

Imaging control system 102 may determine a working distance in any suitable manner as may serve a particular implementation. In certain implementations, imaging control system 102 may determine a working distance based on a depth map of a scene. To that end, imaging control system 102 may obtain a depth map of the scene in any suitable manner. For example, imaging control system 102 may use stereoscopic imaging device 104 to capture depth data, which imaging control system 102 may then use to generate a depth map of the scene in any suitable manner. Alternatively, imaging control system 102 may receive the depth map from any suitable source. Based on the depth map of the scene, imaging control system 102 may determine the working distance between a target surface and stereoscopic imaging device 104.

Additionally or alternatively, imaging control system 102 may determine a working distance between a target surface and stereoscopic imaging device 104 based on a position of an instrument (e.g., a surgical instrument) within the scene. Imaging control system 102 may determine the position of the instrument in any suitable manner. For example, in implementations where stereoscopic imaging device 104 is included as part of or communicatively coupled to a computer-assisted surgical system such as described herein, imaging control system 102 may access kinematics data associated with the instrument to determine a working distance. For example, a tip of an instrument may be in contact with tissue in a surgical scene that may be used as a target surface. Imaging control system 102 may access the kinematics data to determine a position of the tip of the instrument within the scene and may infer the position of the tissue based on the position of the tip of the instrument. Imaging control system 102 may then determine the working distance between the tissue and stereoscopic imaging device 104 in any suitable manner based on the position of the instrument.

Additionally or alternatively, imaging control system 102 may determine a working distance between a target surface and stereoscopic imaging device 104 based on user input. Such user input may be provided in any suitable manner by way of any suitable user interface associated with imaging control system 102. For example, a user may provide the user input by way of a user control console associated with imaging control system 102. The user input may identify a position of a target surface within the scene. Imaging control system 102 may determine the working distance between the target surface and image sensors 114 in any suitable manner based on the position identified by the user.

In certain examples, imaging control system 102 may determine a working distance based on an optical path distance between a target surface and stereoscopic imaging device 104. To that end, imaging control system 102 may determine a first optical path distance between pixel array 116-1 and a target surface. Imaging control system 102 may also determine a second optical path distance between pixel array 116-2 and the target surface. In certain examples, the first optical path distance and the second optical path distance may be the same distance. For example, the first optical path distance and the second optical path distance may be the same when image sensors 114 have a parallel front-facing configuration. Alternatively, the first optical path distance and the second optical path distance may be different. For example, the first optical path distance may be different from the second optical path distance in implementations where image sensors 114 have a parallel front-facing configuration but a target surface is closer, for example, to image sensor 114-1 than image sensor 114-2.

The optical path distance may correspond to a distance that light may travel from the target surface to a surface of image sensors 114. Imaging control system 102 may determine the optical path distance in any suitable manner. For example, imaging control system 102 may use depth data, kinematics data, and/or any other information in combination with information associated with the configuration of image sensors 114 to determine the optical path distance.

Based on the working distance between a target surface and stereoscopic imaging device 104, imaging control system 102 may adjust one or more of a position of a first window within pixel array 116-1 or a position of a second window within pixel array 116-2.

Imaging control system 102 may adjust a position of the windows within pixel arrays 116 in any suitable manner. For example, in certain implementations, imaging control system 102 may adjust the windows by moving the first window and/or the second window towards one another as the working distance between the target surface and the stereoscopic imaging device increases. Imaging control system 102 may adjust the position of the windows by moving the first window and the second window away from one another as the working distance between the target surface and the stereoscopic imaging device decreases. Alternatively, imaging control system 102 may adjust the windows by moving the first window and/or the second window away from one another as the working distance between the target surface and the stereoscopic imaging device increases. Imaging control system 102 may adjust the position of the windows by moving the first window and the second window towards from one another as the working distance between the target surface and the stereoscopic imaging device decreases.

Figure 2:
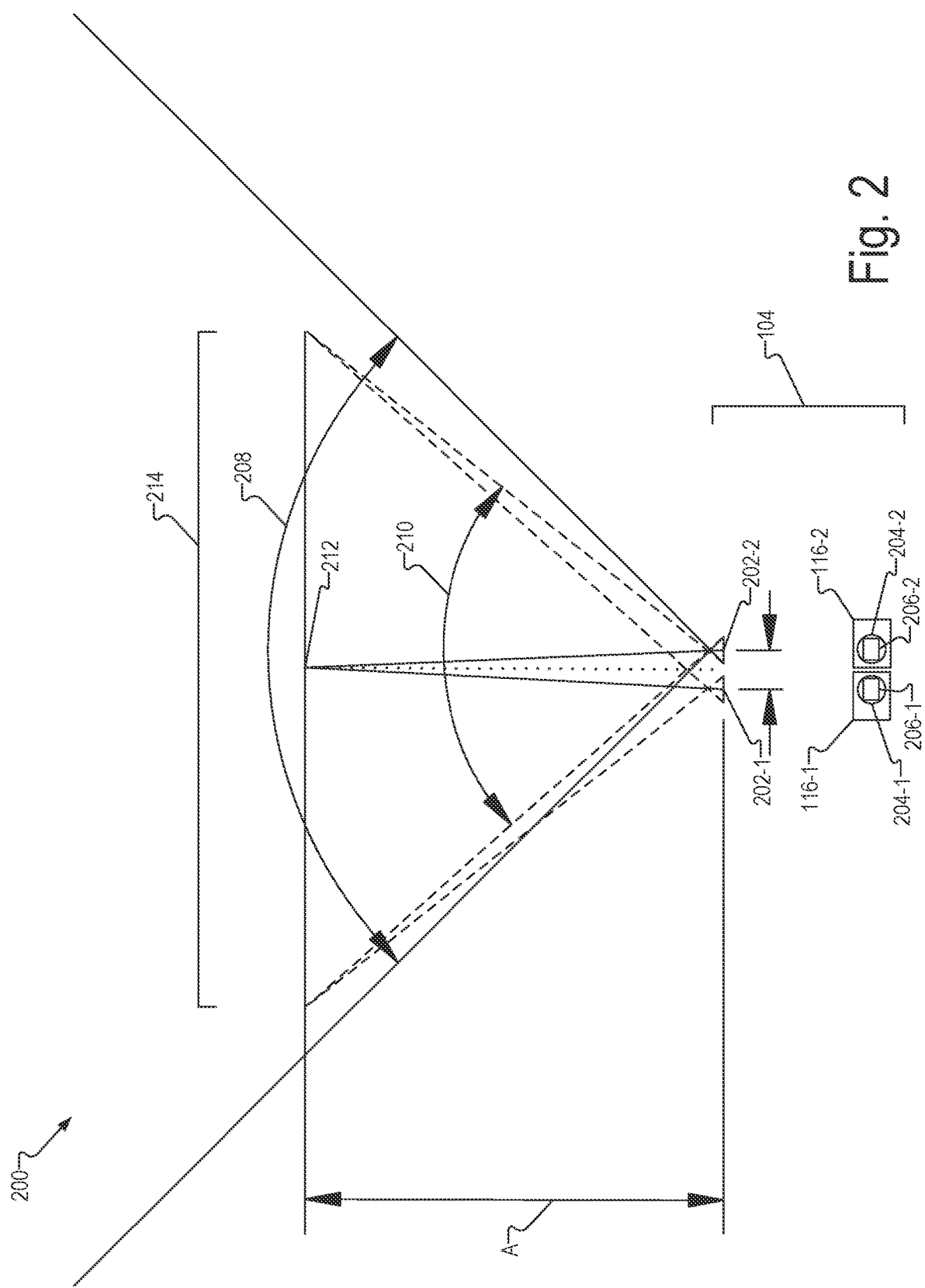
FIGS. 2 and 3 show illustrative configurations of a stereoscopic imaging device according to principles described herein.

FIG. 2 shows an illustrative configuration 200 that stereoscopic imaging device 104 may have in certain implementations. In the example shown in FIG. 2, pixel arrays 116 are positioned adjacent to one another in a parallel front-facing configuration and are positioned to receive light that passes through optical elements 202 (e.g., optical element 202-1 and optical element 202-2). Optical elements 202 may each include one or more lenses and/or any other suitable component.

Light that passes through optical elements 202 may be incident upon pixel arrays 116 in any suitable manner. In the example shown in FIG. 2, light that passes through optical element 202-1 may be incident on pixel array 116-1 in the form of a circle 204-1. Similarly, light that passes through optical element 202-2 may be incident on pixel array 116-2 in the form of a circle 204-2. The size of circles 204 may be proportional to a size of optical elements 202. Although circles 204 are shown in FIG. 2 as being somewhat smaller than pixel arrays 116, it is understood that circles 204 may have any suitable size as may serve a particular implementation. For example, circles 204 may be relatively larger or smaller with respect to pixel arrays 116 than that shown in FIG. 2. The rectangles provided respectively within circles 204 correspond to windows 206 (e.g., windows 206-1 and 206-2) that are provided respectively within pixel arrays 116 and that define regions of pixels within pixel arrays 116 that are used for the windowed outputs.

Optical elements 202 may each have a larger field of view than what is required to capture imagery of a scene. In addition, pixel arrays 116 may each have enough pixels to capture light from the larger fields of view. For example, optical element 202-2 has an angular field of view 208. Angular field of view 208 may have any viewing angle as may serve a particular implementation. For example, angular field of view 208 may correspond to a 90° field of view in certain examples.

Only a portion of angular field of view 208 associated with optical element 202-2 may be used at a given time. In the example shown in FIG. 2, angular field of view 210, which is smaller than angular field of view 208, is used to capture imagery of the scene. Angular field of view 210 may have any suitable viewing angle smaller than angular field of view 208. For example, angular field of view 210 may have a viewing angle of approximately 70-80° in certain examples. For simplicity, angular field of view 208 and angular field of view 210 are only shown with respect to optical element 202-2. In FIG. 2, optical element 202-1 is shown with broken lines depicting an angular field of view that is similar in size to angular field of view 210. It is understood that, although not shown in FIG. 2, optical element 202-1 would also have a relatively large angular field of view but may be configured to capture imagery of the scene from a relatively smaller angular field of view (e.g., the angular field of view depicted in broken lines from optical element 202-1 in FIG. 2) at a given time.

Stereoscopic imaging device 104 shown in FIG. 2 may be calibrated for stereo convergence at a convergence point 212 that is a distance "A" from stereoscopic imaging device 104. Distance "A" may correspond to any suitable distance from convergence point 212 as may serve a particular implementation. For example, in certain implementations, distance "A" may be 45 mm from convergence point 212. With such a calibration, stereoscopic imaging device 104 is optimized for capturing imagery of objects that are positioned at distance "A" from stereoscopic imaging device 104.

Overlap 214 shown in FIG. 2 represents a region where there is a common field of view between the angular field of view associated with optical element 202-1 and the angular field of view associated with optical element 202-2. While stereoscopic imaging device 104 is calibrated for stereo convergence at convergence point 212, stereoscopic imaging device 104 may be used to capture imagery of a target surface that is at a distance from stereoscopic imaging device 104 that is different than distance "A." When the distance is different than distance "A," the size of the common angular field of view between the angular field of view associated with optical element 202-1 and the angular field of view associated with optical element 202-2 may change. In certain examples, such a change may result in a relatively smaller angular field of view being available to provide a stereoscopic image of the scene.

Figure 3:
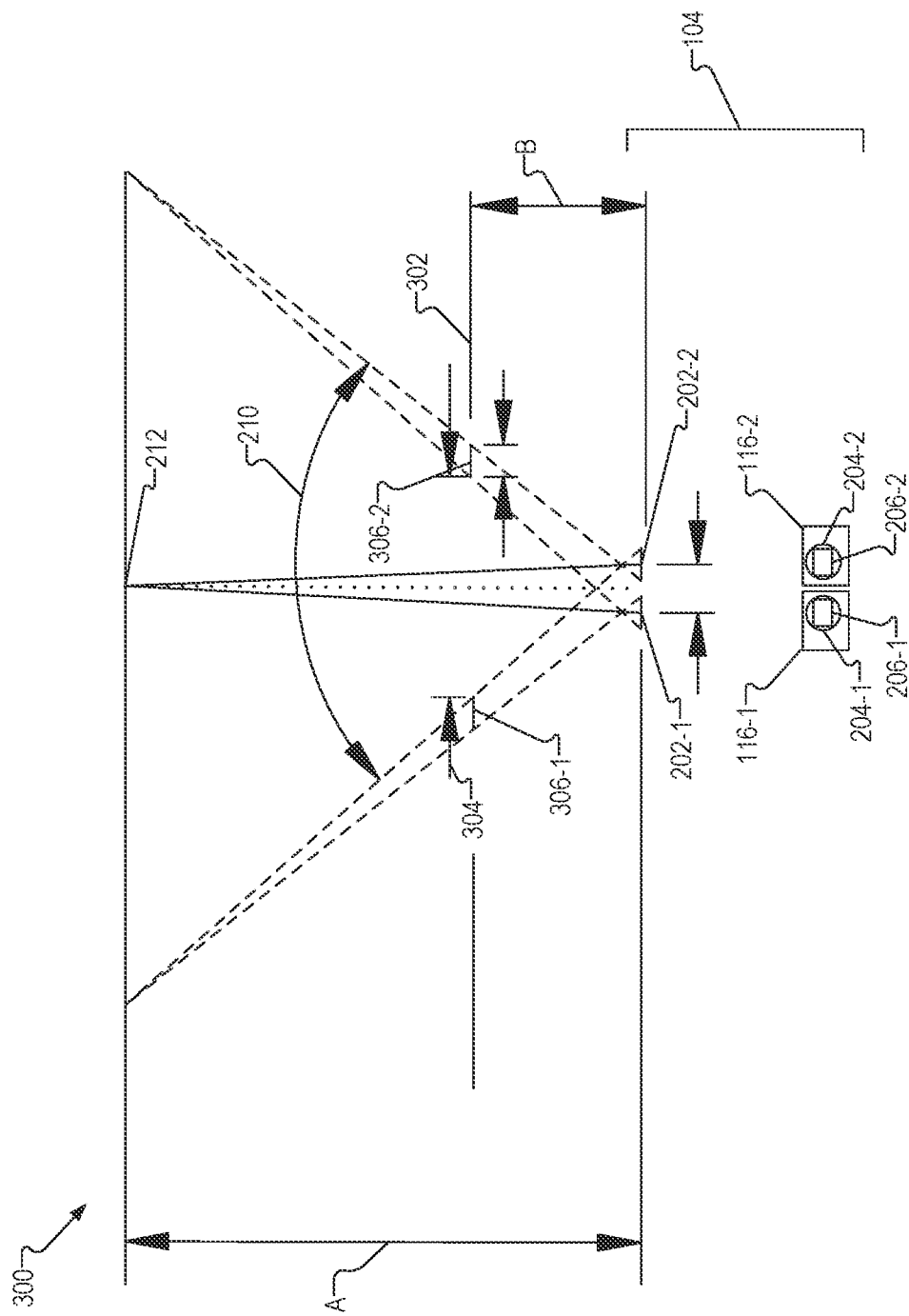

To illustrate, FIG. 3 shows an illustrative configuration 300 of stereoscopic imaging device 104. As shown in FIG. 3, stereoscopic imaging device 104 is calibrated for stereo convergence at convergence point 212 similar to that shown in FIG. 2. However, stereoscopic imaging device 104 is at a distance "B" (e.g., 15 mm) from a target surface 302 instead of distance "A." At distance "B," the amount of overlap 304 between the angular field of view associated with optical element 202-1 and optical element 202-2 is reduced as compared to overlap 214 shown in FIG. 2. This is illustrated by regions 306 (e.g., regions 306-1 and 306-2) that are not in common between the angular fields of view at distance "B." In particular, region 306-1 is included as part of the angular field of view associated with optical element 202-1 but does not have a corresponding view within the angular field of view associated with optical element 202-2. Similarly, region 306-2 is included as part of the angular field of view associated with optical element 202-2 but does not have a corresponding view within the angular field of view associated with optical element 202-1.

Figure 4:
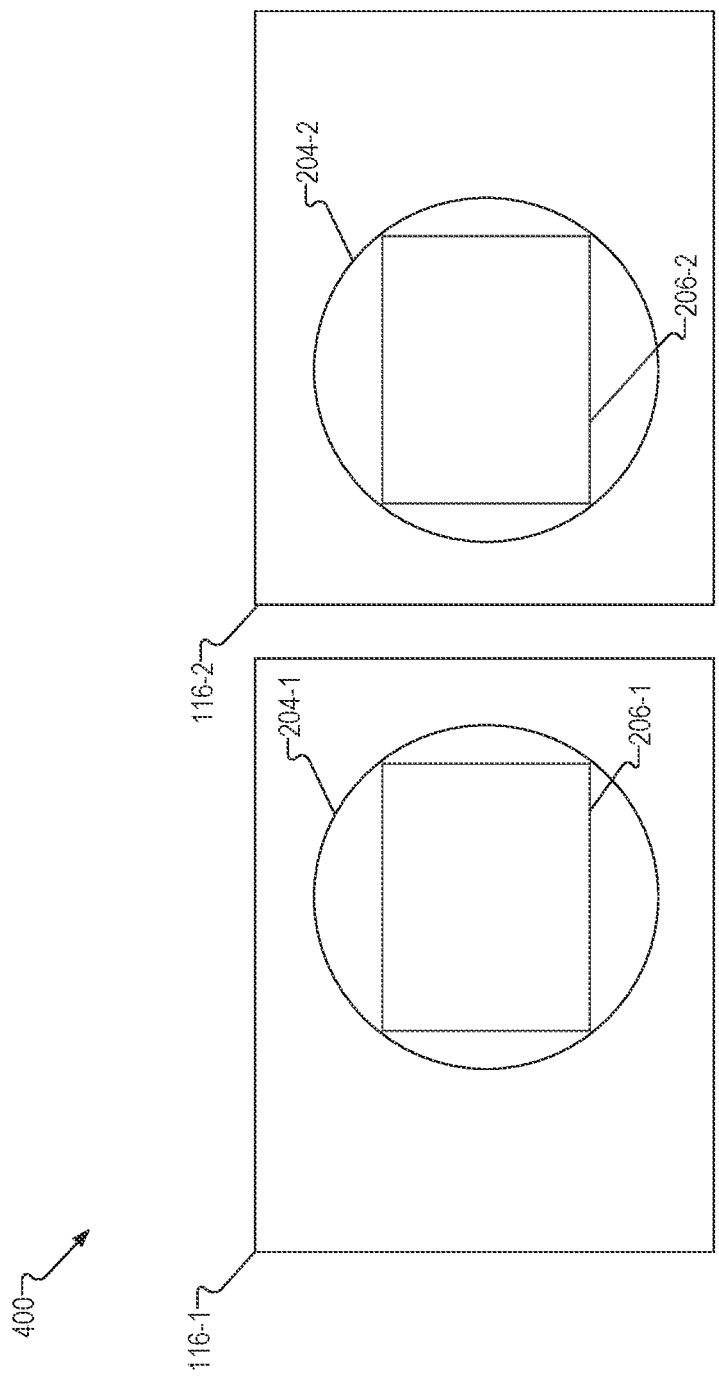
FIGS. 4-6 show illustrative positions of windowed portions on pixel arrays according to principles described herein.

The reduction in the amount of overlap between the angular fields of view associated with optical elements 202 may undesirably reduce a stereo matched field of view that may be presented to user. To prevent or mitigate this, system 100 may be configured to dynamically adjust a position of the windows to optimize the amount of overlap between the angular fields of view as the distance changes. This may be accomplished in any suitable manner. To illustrate, FIG. 4 shows an illustrative configuration 400 that depicts positions of windows 206 within pixel arrays 116. The positions shown in FIG. 4 may correspond to positions of windows 206 when a target surface in a scene is at distance "A" shown in FIG. 2.

Figure 5:
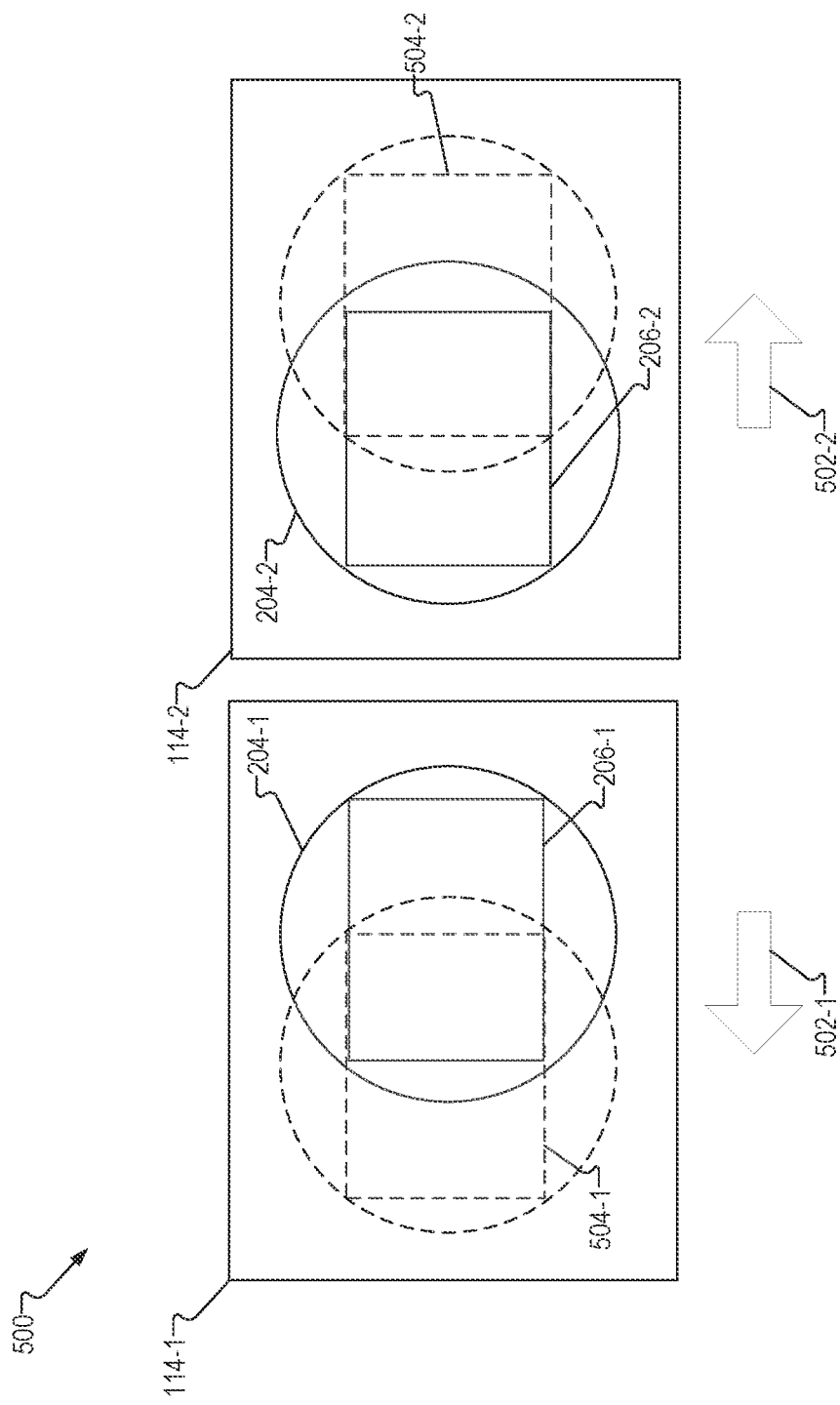

Imaging control system 102 may determine in any suitable manner described herein that there has been a change in a working distance between a target surface and stereoscopic imaging device 104. For example, the distance may change from distance "A" shown in FIG. 2 to distance "B" shown in FIG. 3. Based on the change in the distance, imaging control system 102 may adjust one or more of a position of window 206-1 within pixel array 116-1 or a position of window 206-2 within pixel array 116-2. To illustrate, FIG. 5 shows an illustrative configuration 500 in which imaging control system 102 may shift window 206-1 in the direction of arrow 502-1 to a position represented by dashed box 504-1. Similarly, imaging control system 102 may shift window 206-2 in the direction of arrow 502-2 to a position represented by dashed box 504-1. The shifting of window 206-2 in the direction of arrow 502-2 effectively results in a different portion of angular field of view 208 being used than is shown in FIG. 2. For example, the shifting of window 206-2 may result in angular field of view 210 pivoting leftward in FIG. 2. Similarly, the shifting of window 206-1 may result in an angular field of view associated with optical element 202-1 pivoting rightward in FIG. 2. As shown in FIG. 2, the shifting of window 206-1 in the direction of arrow 502-1 also includes shifting circle 204-1 in the direction of arrow 502-1. Likewise, the shifting of window 206-2 in the direction of arrow 502-2 also includes shifting circle 204-2 in the direction of arrow 502-2.

Figure 6:
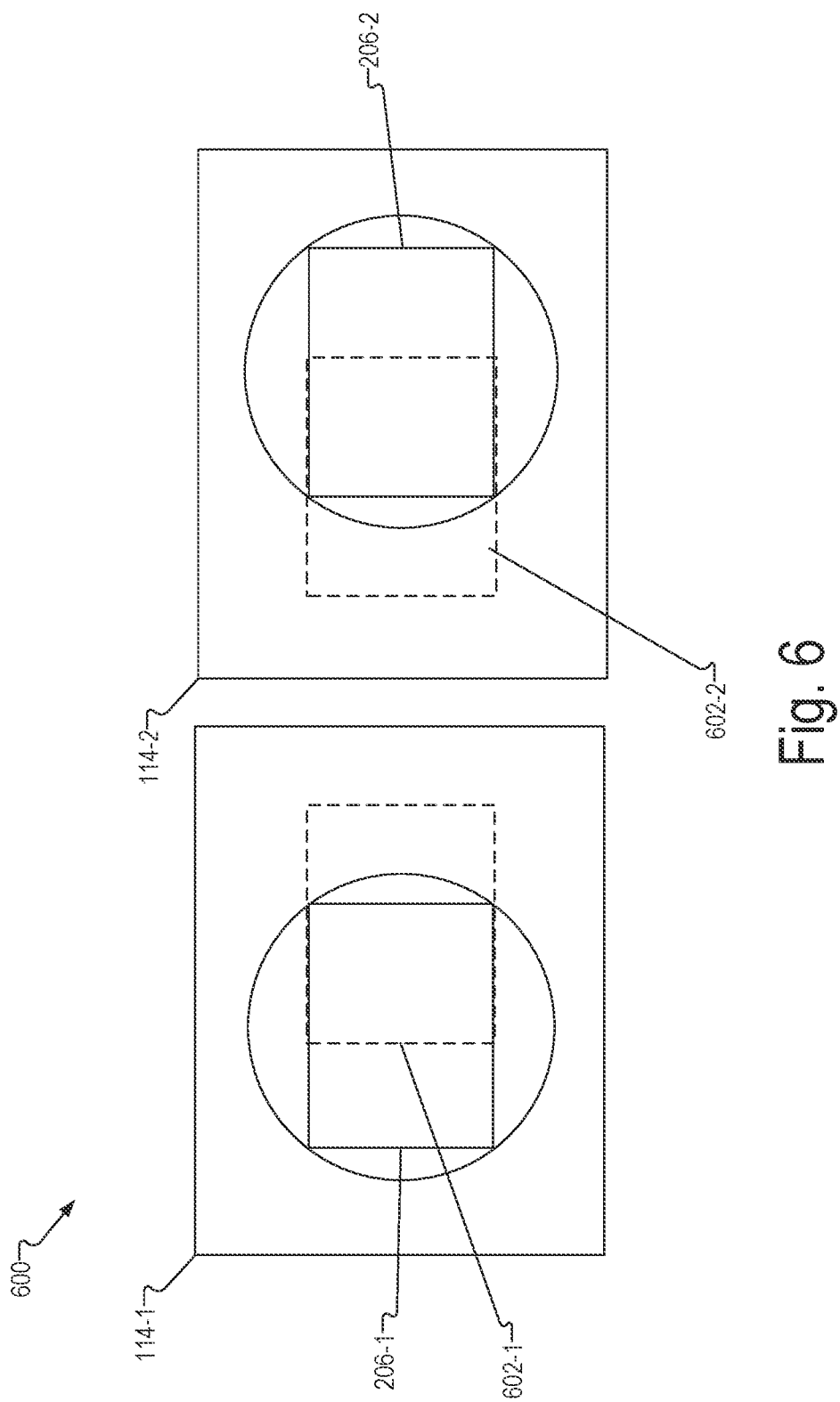

FIG. 6 shows an illustrative configuration 600 that depicts the position of windows 206 after imaging control system 102 changed position of windows 206 within pixel arrays 116. As shown in FIG. 6, dashed windows 602 (e.g., dashed window 602-1 and dashed window 602-2) represent the previous positions of windows 206 shown in FIG. 4. As such, window 206-1 is positioned farther away from window 206-2 as compared to that shown in FIG. 4.

In the example shown in FIGS. 4-6, the adjusting of windows 206 includes moving window 206-1 and window 206-2 away from one another as the working distance between the target surface and stereoscopic imaging device decreases. Such a movement of windows 206 away from each other as the distance decreases may be because optical elements 202 invert the images captured within the respective angular fields of view. As previously explained, windows 206 may move toward each other in other implementations as the working distance decreases.

Figure 7:
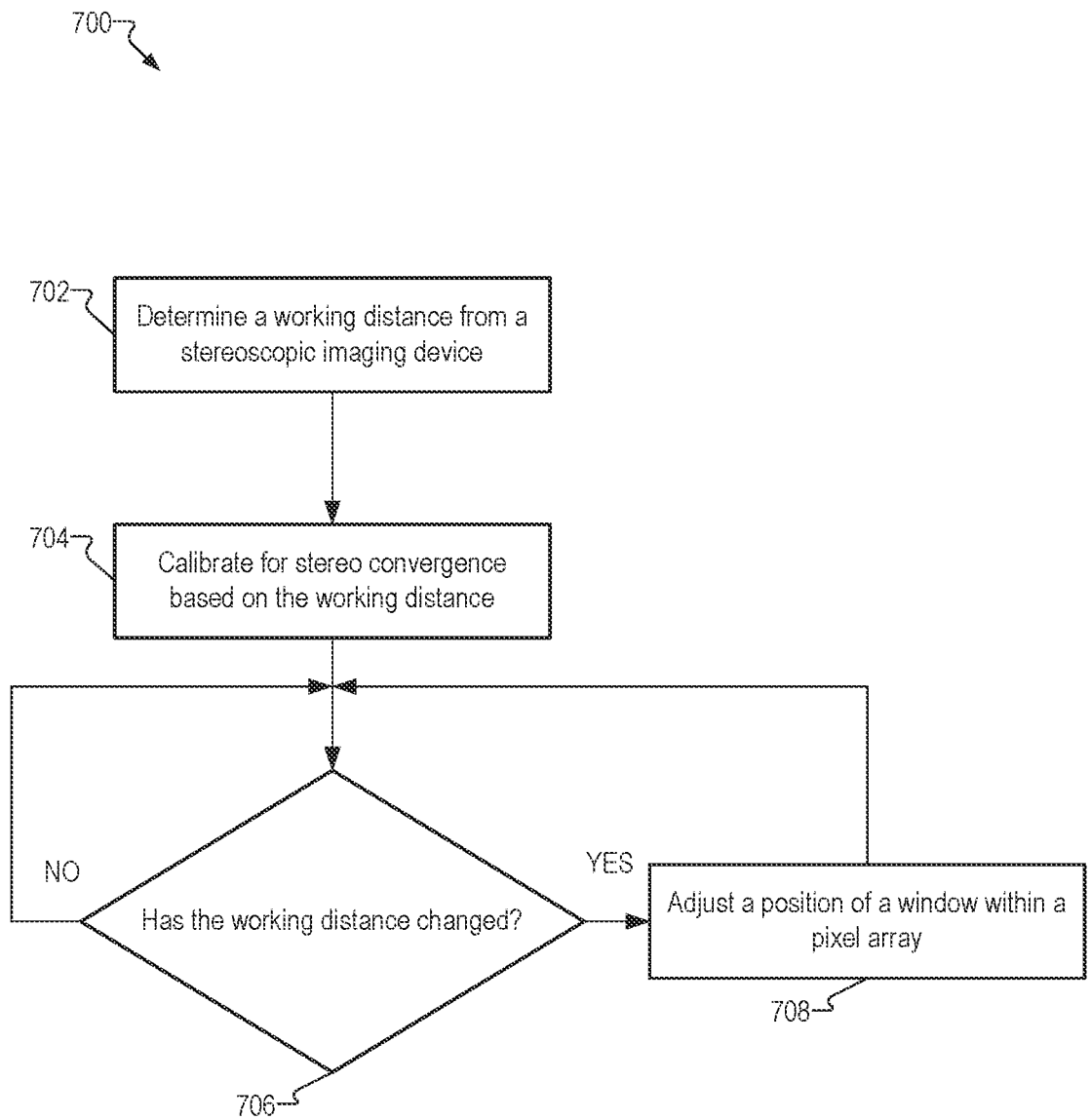
FIG. 7 shows an illustrative flow chart depicting various operations that may be performed by the system illustrated in FIG. 1 according to principles described herein.

FIG. 7 shows an illustrative flow chart 700 depicting various operations that may be performed by imaging control system 102 to implement distance-based image sensor windowing. As shown in FIG. 7, imaging control system 102 may determine a working distance from a stereoscopic imaging device (e.g., stereoscopic imaging device 104) at operation 702. Imaging control system 102 may determine the working distance in any suitable manner such as described herein.

At operation 704, imaging control system 102 may calibrate the stereoscopic imaging device for stereo convergence based on the working distance.

At operation 706, imaging control system 102 may determine whether the working distance has changed.

If the answer at operation 706 is "NO," imaging control system 102 may return the flow to before operation 706. Conversely, if the answer at operation 706 is "YES," system 100 may adjust a position of a window within a pixel array (e.g., pixel array 116-1) at operation 708 in any suitable manner such as described herein.

After adjusting the position of the window, imaging control system 102 may return the flow to before operation 706. At operation 706, imaging control system 102 may determine again whether the working distance has changed. If the answer at operation 706 is "YES," imaging control system 102 may readjust a position of a window within a pixel array at operation 708. This process may be repeated any suitable number of times. This process may also be performed for both pixel arrays of a stereoscopic imaging device.

Such operations illustrated in FIG. 7 may result in a continuous feedback loop where imaging control system 102 continually monitors a scene for changes in a working distance and readjusts positions of windows within one or more pixel arrays in real time based on changes in the working distance. In so doing, it is possible to optimize the angular field of view that is viewable with both eyes of a user at any working suitable distance within the scene.

In certain examples, illustrative systems and methods such as those described herein may be configured to operate as part of or in conjunction with a plurality of different types of computer-assisted surgical systems. The plurality of different types of computer-assisted surgical systems may be of different types at least because they include different types of surgical instrument manipulating systems. For example, a first computer-assisted surgical system may include a first type of surgical instrument manipulating system, a second computer-assisted surgical system may include a second type of surgical instrument manipulating system, and a third computer-assisted surgical system may include a third type of surgical instrument manipulating system.

Each type of surgical instrument manipulating system may have a different architecture (e.g., a manipulator arm architecture), have a different kinematic profile, and/or operate according to different configuration parameters. An illustrative computer-assisted surgical system with a first type of surgical instrument manipulating system will now be described with reference to FIG. 8. The described illustrative computer-assisted surgical system is illustrative and not limiting. Systems such as those described herein may operate as part of or in conjunction with the described computer-assisted surgical system and/or any other suitable computer-assisted surgical system.

Figure 8:
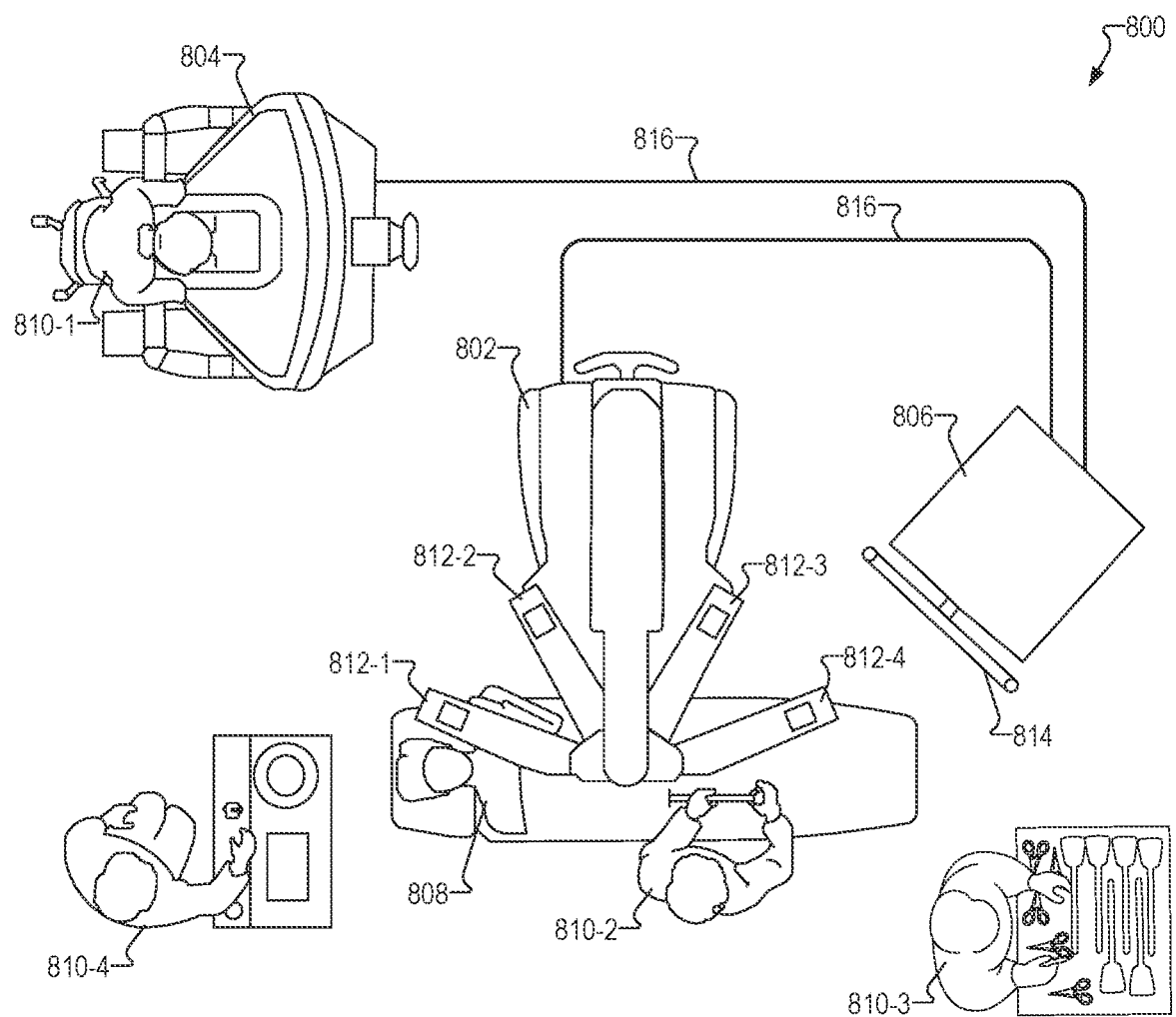
FIG. 8 shows an illustrative computer-assisted surgical system according to principles described herein.

FIG. 8 shows an illustrative computer-assisted surgical system 800 ("surgical system 800"). As shown, surgical system 800 may include a surgical instrument manipulating system 802 ("manipulating system 802"), a user control system 804, and an auxiliary system 806 communicatively coupled one to another.

Surgical system 800 may be utilized by a surgical team to perform a computer-assisted surgical procedure on a patient 808. As shown, the surgical team may include a surgeon 810-1, an assistant 810-2, a nurse 810-3, and an anesthesiologist 810-4, all of whom may be collectively referred to as "surgical team members 810." Additional or alternative surgical team members may be present during a surgical session as may serve a particular implementation.

While FIG. 8 illustrates an ongoing minimally invasive surgical procedure, surgical system 800 may similarly be used to perform open surgical procedures or other types of surgical procedures that may similarly benefit from the accuracy and convenience of surgical system 800. Additionally, it will be understood that the surgical session throughout which surgical system 800 may be employed might not only include an operative phase of a surgical procedure, as is illustrated in FIG. 8, but may also include preoperative, postoperative, and/or other suitable phases of the surgical procedure. A surgical procedure may include any procedure in which manual and/or instrumental techniques (e.g., teleoperated instrumental techniques) are used on a patient to investigate, diagnose, or treat a physical condition of the patient. Additionally, a surgical procedure may include any procedure that is not performed on a live patient, such as a calibration procedure, a simulated training procedure, and an experimental or research procedure.

As shown in FIG. 8, surgical instrument manipulating system 802 may include a plurality of manipulator arms 812 (e.g., manipulator arms 812-1 through 812-4) to which a plurality of robotic surgical instruments ("robotic instruments") (not shown) may be coupled. As used herein, a "robotic instrument" refers to any instrument that may be directly attached to (e.g., plugged into, fixedly coupled to, mated to, etc.) a manipulator arm (e.g., manipulator arm 812-1) such that movement of the manipulator arm directly causes movement of the instrument. Each robotic instrument may be implemented by any suitable therapeutic instrument (e.g., a tool having tissue-interaction functions), imaging device (e.g., an endoscope), diagnostic instrument, or the like that may be used for a computer-assisted surgical procedure (e.g., by being at least partially inserted into patient 808 and manipulated to perform a computer-assisted surgical procedure on patient 808). In certain examples, stereoscopic imaging device 104 may be implemented as part of an imaging device that is communicatively coupled to one of manipulator arms 812. In some examples, one or more of the robotic instruments may include force-sensing and/or other sensing capabilities.

In the example shown in FIG. 8, manipulator arms 812 of manipulating system 802 are attached on a distal end of an overhead boom that extends horizontally. However, manipulator arms 812 may have other configurations in certain implementations. In addition, while manipulating system 802 is depicted and described herein as including four manipulator arms 812, it will be recognized that manipulating system 802 may include only a single manipulator arm 812 or any other number of manipulator arms as may serve a particular implementation.

Manipulator arms 812 and/or robotic instruments attached to manipulator arms 812 may include one or more displacement transducers, orientational sensors, and/or positional sensors (hereinafter "surgical system sensors") used to generate raw (e.g., uncorrected) kinematics information. One or more components of surgical system 800 may be configured to use the kinematics information to track (e.g., determine positions of) and/or control the robotic instruments.

In addition, manipulator arms 812 may each include or otherwise be associated with a plurality of motors that control movement of manipulator arms 812 and/or the surgical instruments attached thereto. For example, manipulator arm 812-1 may include or otherwise be associated with a first internal motor (not explicitly shown) configured to yaw manipulator arm 812-1 about a yaw axis. In like manner, manipulator arm 812-1 may be associated with a second internal motor (not explicitly shown) configured to drive and pitch manipulator arm 812-1 about a pitch axis. Likewise, manipulator arm 812-1 may be associated with a third internal motor (not explicitly shown) configured to slide manipulator arm 812-1 along insertion axis. Manipulator arms 812 may each include a drive train system driven by one or more of these motors in order to control the pivoting of manipulator arms 812 in any manner as may serve a particular implementation. As such, if a robotic instrument attached, for example, to manipulator arm 812-1 is to be mechanically moved, one or more of the motors coupled to the drive train may be energized to move manipulator arm 812-1.

Robotic instruments attached to manipulator arms 812 may each be positioned in a surgical scene. A "surgical scene" may, in certain examples, be entirely disposed within a patient and may include an area within the patient at or near where a surgical procedure is planned to be performed, is being performed, or has been performed. For example, for a minimally invasive surgical procedure being performed on tissue internal to a patient, the surgical scene may include the tissue, anatomy underlying the tissue, as well as space around the tissue where, for example, robotic instruments and/or other instruments being used to perform the surgical procedure are located. In other examples, a surgical scene may be at least partially disposed external to the patient at or near where a surgical procedure is planned to be performed, is being performed, or has been performed on the patient. For instance, surgical system 800 may be used to perform an open surgical procedure such that part of the surgical scene (e.g., tissue being operated on) is internal to the patient while another part of the surgical scene (e.g., a space around the tissue where one or more instruments may be disposed) is external to the patient. A robotic instrument may be referred to as being positioned or located at or within a surgical scene when at least a portion of the robotic instrument (e.g., a distal portion of the robotic instrument) is located within the surgical scene.

User control system 804 may be configured to facilitate control by surgeon 810-1 of manipulator arms 812 and robotic instruments attached to manipulator arms 812. For example, surgeon 810-1 may interact with user control system 804 to remotely move, manipulate, or otherwise teleoperate manipulator arms 812 and the robotic instruments. To this end, user control system 804 may provide surgeon 810-1 with imagery (e.g., high-definition three-dimensional (3D) imagery) of a surgical scene associated with patient 808 as captured by an imaging device. In certain examples, user control system 804 may include a stereoscopic image viewer having two displays where stereoscopic images (e.g., 3D images) of a surgical scene associated with patient 808 and generated by a stereoscopic imaging system may be viewed by surgeon 810-1. Such a stereoscopic image viewer may be used to represent imagery captured by stereoscopic imaging device 104 to Surgeon 810-1. Surgeon 810-1 may utilize the imagery to perform one or more procedures with one or more robotic instruments attached to manipulator arms 812.

To facilitate control of robotic instruments, user control system 804 may include a set of master controls (not shown). These master controls may be manipulated by surgeon 810-1 to control movement of robotic instruments (e.g., by utilizing robotic and/or teleoperation technology). The master controls may be configured to detect a wide variety of hand, wrist, and finger movements by surgeon 810-1. In this manner, surgeon 810-1 may intuitively perform a surgical procedure using one or more robotic instruments.

User control system 804 may further be configured to facilitate control by surgeon 810-1 of other components of surgical system 800. For example, surgeon 810-1 may interact with user control system 804 to change a configuration or operating mode of surgical system 800, to change a display mode of surgical system 800, to generate additional control signals used to control surgical instruments attached to manipulator arms 812, to facilitate switching control from one robotic instrument to another, to facilitate interaction with other instruments and/or objects within the surgical scene, to indicate a location of a target surface, or to perform any other suitable operation. To this end, user control system 804 may also include one or more input devices (e.g., foot pedals, buttons, switches, etc.) configured to receive input from surgeon 810-1.

Auxiliary system 806 may include one or more computing devices configured to perform primary processing operations of surgical system 800. The one or more computing devices included in auxiliary system 806 may control and/or coordinate operations performed by various other components (e.g., manipulating system 802 and/or user control system 804) of surgical system 800. For example, a computing device included in user control system 804 may transmit instructions to manipulating system 802 by way of the one or more computing devices included in auxiliary system 806. As another example, auxiliary system 806 may receive, from manipulating system 802, and process image data representative of imagery captured by an imaging device attached to one of manipulator arms 812.

In some examples, auxiliary system 806 may be configured to present visual content to surgical team members 810 who might not have access to the images provided to surgeon 810-1 at user control system 804. To this end, auxiliary system 806 may include a display monitor 814 configured to display one or more user interfaces, such as images (e.g., 2D images) of the surgical scene, information associated with patient 808 and/or the surgical procedure, and/or any other visual content as may serve a particular implementation. For example, display monitor 814 may display images of the surgical scene together with additional content (e.g., representations of target objects, graphical content, contextual information, etc.) concurrently displayed with the images. In some embodiments, display monitor 814 is implemented by a touchscreen display with which surgical team members 810 may interact (e.g., by way of touch gestures) to provide user input to surgical system 800.

Manipulating system 802, user control system 804, and auxiliary system 806 may be communicatively coupled one to another in any suitable manner. For example, as shown in FIG. 8, manipulating system 802, user control system 804, and auxiliary system 806 may be communicatively coupled by way of control lines 816, which may represent any wired or wireless communication link as may serve a particular implementation. To this end, manipulating system 802, user control system 804, and auxiliary system 806 may each include one or more wired or wireless communication interfaces, such as one or more local area network interfaces, Wi-Fi network interfaces, cellular interfaces, etc.

Figure 9:
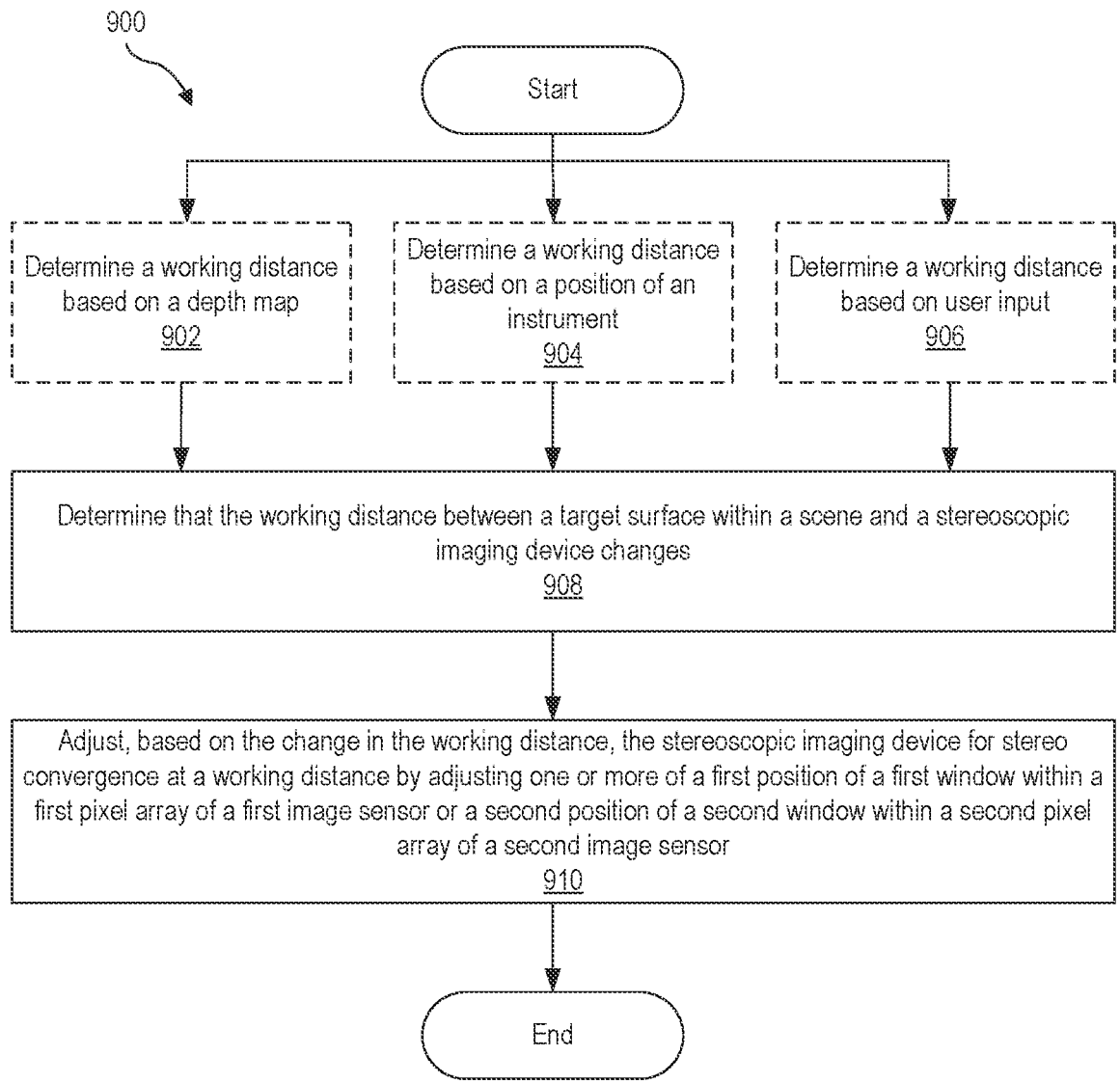
FIG. 9 shows an illustrative method according to principles described herein.

FIG. 9 depicts an illustrative method 900 implementing distance-based image sensor widowing. While FIG. 9 depicts illustrative operations according to one embodiment, other embodiments may omit, add to, reorder, and/or modify any of the operations shown in FIG. 9. One or more of the operations shown in FIG. 9 may be performed by a system such as imaging control system 102, any components included therein, and/or any implementation thereof.

At operation 902, an imaging control system (e.g., imaging control system 102) may determine a working distance based on a depth map. Operation 902 may be performed in any of the ways described herein.

At operation 904, the imaging control system may additionally or alternatively determine the working distance based on a position of an instrument. Operation 904 may be performed in any of the ways described herein.

At operation 906, the imaging control system may additionally or alternatively determine the working distance based on user input. Operation 906 may be performed in any of the ways described herein.

Any of operations 902 through 906 may be used to determine the working distance in certain implementations.

At operation 908, the imaging control system may determine that a working distance between a target surface within a scene and a stereoscopic imaging device changes. As described herein, the stereoscopic imaging device may comprise a first image sensor having a first pixel array that may be configured to provide a first windowed output. The first windowed output may comprise first image information associated with pixels included within a first window of the first pixel array. The first window may have a first position that is adjustable within the first pixel array and a smaller pixel resolution than the first pixel array. The stereoscopic imaging device may further include a second image sensor having a second pixel array that may be configured to provide a second windowed output. The second windowed output may comprise second image information associated with pixels included within a second window of the second pixel array. The second window may have a second position that is adjustable within the second pixel array and a smaller pixel resolution than the second pixel array. Operation 908 may be performed in any of the ways described herein.

At operation 910, the imaging control system may adjust, based on the change in the working distance, the stereoscopic imaging device for stereo convergence at the working distance by adjusting one or more of the first position of the first window within the first pixel array or the second position of the second window within the second pixel array. Operation 910 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Illustrative non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Illustrative volatile storage media include, but are not limited to, RAM (e.g., dynamic RAM).

Figure 10:
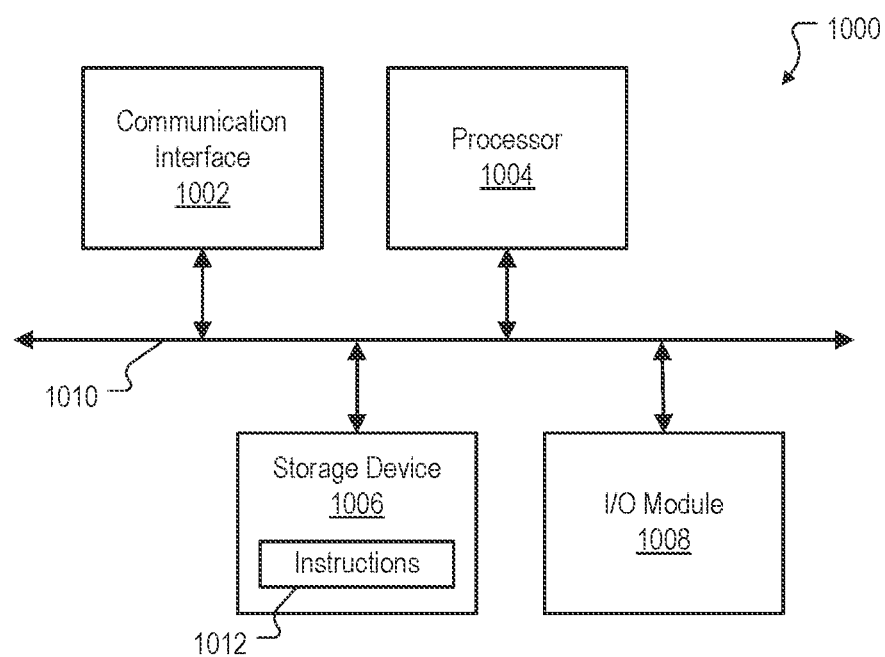
FIG. 10 shows an illustrative computing device according to principles described herein.

FIG. 10 illustrates an illustrative computing device 1000 that may be specifically configured to perform one or more of the processes described herein. As shown in FIG. 10, computing device 1000 may include a communication interface 1002, a processor 1004, a storage device 1006, and an input/output ("I/O") module 1008 communicatively connected one to another via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of the non-volatile media and/or volatile media described herein. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1000. For example, memory 110 may be implemented by storage device 1006, and processor 108 may be implemented by processor 1004.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a stereoscopic imaging device comprising:
a first image sensor having a first pixel array and configured to provide a first windowed output, the first windowed output comprising first image information associated with pixels included within a first window of the first pixel array, the first window having a first position that is adjustable within the first pixel array and a smaller pixel resolution than the first pixel array; and
a second image sensor having a second pixel array and configured to provide a second windowed output, the second windowed output comprising second image information associated with pixels included within a second window of the second pixel array, the second window having a second position that is adjustable within the second pixel array and a smaller pixel resolution than the second pixel array; and
an imaging control system configured to:
determine a working distance between a target surface within a scene and the stereoscopic imaging device; and
adjust, based on the working distance between the target surface and the stereoscopic imaging device, one or more of the first position of the first window within the first pixel array or the second position of the second window within the second pixel array.

2. The system of claim 1, wherein:
prior to the adjusting, the stereoscopic imaging device is calibrated for stereo convergence at a convergence point that is a second working distance from the stereoscopic imaging device;
the imaging control system is further configured to determine that the working distance is different than the second working distance; and
the adjusting is performed based on the determining that the working distance is different than the second working distance.

3. The system of claim 1, wherein the imaging control system is further configured to:
determine, after the adjusting, that the stereoscopic imaging device is positioned at a second working distance from the target surface within the scene, the second working distance different than the working distance; and
readjust, based on the second working distance, one or more of the first position of the first window within the first pixel array or the second position of the second window within the second pixel array.

4. The system of claim 1, wherein the first and second image sensors are configured to abstain from outputting image information associated with pixels not included in the first and second windows.

5. The system of claim 1, wherein the imaging control system is further configured to:
determine a first optical path distance between the first pixel array and the target surface; and
determine a second optical path distance between the second pixel array and the target surface,
wherein the determining the working distance is based on the first optical path distance and the second optical path distance.

6. The system of claim 1, wherein:
the stereoscopic imaging device further comprises:
a first lens that is associated with the first image sensor and that has a first angular field of view; and
a second lens that is associated with the second image sensor and that has a second angular field of view; and
while the stereoscopic imaging device is at the working distance,
the first image sensor is configured to capture light from a third angular field of view that is less than the first angular field of view, and
the second image sensor is configured to capture light from a fourth angular field of view that is less than the second angular field of view.

7. The system of claim 6, wherein the first window and the second window are associated with regions of the third angular field of view and the fourth angular field of view that overlap one another at the working distance.

8. The system of claim 1, wherein the adjusting includes moving the first window and the second window away from one another as the working distance between the target surface and the stereoscopic imaging device decreases.

9. The system of claim 1, wherein the adjusting includes moving the first window and the second window towards one another as the working distance between the target surface and the stereoscopic imaging device decreases.

10. The system of claim 1, wherein:
the imaging control system is further configured to obtain a depth map of the scene; and
the determining the working distance between the target surface and the stereoscopic imaging device is based on the depth map of the scene.

11. The system of claim 1, wherein:
the imaging control system is further configured to determine a position of an instrument within the scene; and
the determining the working distance between the target surface and the stereoscopic imaging device is based on the position of the instrument within the scene.

12. The system of claim 1, wherein:

the imaging control system is further configured to receive a user input that identifies a position of the target surface within the scene; and the determining the working distance between the target surface and the first and second image sensors is based on the user input.

13. The system of claim 1, wherein:

the stereoscopic imaging device is attached to a manipulating arm of a computer-assisted surgical system; and the scene corresponds to a surgical scene that the stereoscopic imaging device images during a surgical procedure.

14. An apparatus comprising:

one or more processors; and memory storing executable instructions that, when executed by the one or more processors, cause the apparatus to:

determine a working distance between a target surface within a scene and a stereoscopic imaging device that comprises:

a first image sensor having a first pixel array and configured to provide a first windowed output, the first windowed output comprising first image information associated with pixels included within a first window of the first pixel array, the first window having a first position that is adjustable within the first pixel array and a smaller pixel resolution than the first pixel array; and a second image sensor having a second pixel array and configured to provide a second windowed output, the second windowed output comprising second image information associated with pixels included within a second window of the second pixel array, the second window having a second position that is adjustable within the second pixel array and a smaller pixel resolution than the second pixel array; and adjust, based on the working distance between the target surface and the stereoscopic imaging device, one or more of the first position of the first window within the first pixel array or the second position of the second window within the second pixel array.

15. The apparatus of claim 14, wherein the instructions, when executed by the one or more processors, further cause the apparatus to:

determine, after the adjusting, that the stereoscopic imaging device is positioned at a second working distance from the target surface within the scene, the second working distance different than the working distance; and readjust, based on the second working distance, one or more of the first position of the first window within the first pixel array or the second position of the second window within the second pixel array.

16. The apparatus of claim 14, wherein the adjusting includes moving the first window and the second window away from one another as the working distance between the target surface and the stereoscopic imaging device decreases.

17. The apparatus of claim 14, wherein the instructions, when executed by the one or more processors, further cause the apparatus to:

determine a first optical path distance between the first pixel array and the target surface; and determine a second optical path distance between the second pixel array and the target surface, wherein the determining the working distance is based on the first optical path distance and the second optical path distance.

18. A method comprising:

determining, by an imaging control system, that a working distance between a target surface within a scene and a stereoscopic imaging device changes, the stereoscopic imaging device including a first image sensor and a second image sensor; and adjusting, by the imaging control system and based on the change in the working distance, the stereoscopic imaging device for stereo convergence at the working distance by adjusting one or more of a first position of a first window within a first pixel array of the first image sensor or a second position of a second window within a second pixel array of the second image sensor.

19. The method of claim 18, wherein the adjusting includes moving the first window and the second window away from one another as the working distance between the target surface and the stereoscopic imaging device decreases.

20. The method of claim 18, wherein the adjusting includes moving the first window and the second window towards one another as the working distance between the target surface and the stereoscopic imaging device increases.

* * * * *